(12) United States Patent
Kuschnereit et al.

(10) Patent No.: US 6,967,771 B2
(45) Date of Patent: Nov. 22, 2005

(54) ANTIREFLECTION COATING FOR ULTRAVIOLET LIGHT AT LARGE ANGLES OF INCIDENCE

(75) Inventors: Ralf Kuschnereit, Oberkochen (DE); Hans-Jochen Paul, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 18 days.

(21) Appl. No.: 10/768,665

(22) Filed: Feb. 2, 2004

(65) Prior Publication Data

US 2004/0174587 A1 Sep. 9, 2004

Related U.S. Application Data

(62) Division of application No. 10/012,351, filed on Dec. 12, 2001, now Pat. No. 6,697,194.

(30) Foreign Application Priority Data

Dec. 15, 2000 (DE) .............................. 100 64 143

(51) Int. Cl.$^7$ ............................................... G02B 5/20
(52) U.S. Cl. ..................... 359/359; 359/350; 359/361
(58) Field of Search ................................ 359/359, 350, 359/361, 586–589; 428/408, 426

(56) References Cited

U.S. PATENT DOCUMENTS

| | | | |
|---|---|---|---|
| 3,936,136 A | 2/1976 | Ikeda et al. | |
| 4,997,241 A | 3/1991 | Muratomi | |
| 5,460,888 A | 10/1995 | Hashimoto et al. | |
| 5,532,871 A | 7/1996 | Hashimoto et al. | |
| 5,978,409 A | 11/1999 | Das et al. | |
| 6,030,717 A | 2/2000 | Nakamura et al. | |
| 6,455,227 B1 | 9/2002 | Hara | |
| 6,590,919 B1 | 7/2003 | Ueta | |
| 6,592,992 B2 | 7/2003 | Veerasamy | |

FOREIGN PATENT DOCUMENTS

| | | |
|---|---|---|
| DE | 2165 315 | 7/1973 |
| DE | 298 849 A5 | 3/1992 |
| DE | 298 850 A5 | 3/1992 |
| DE | 198 31 392 A1 | 2/2000 |
| EP | 0 855 604 A1 | 7/1998 |
| EP | 1 227 344 A | 7/2002 |
| JP | 63 285 501 A | 11/1988 |
| JP | 10253802 A | 9/1998 |
| WO | WO 91/08106 A1 | 6/1991 |

OTHER PUBLICATIONS

H. Ganesha Shanbhogue, et al, "Multilayer antireflection coatings for the visible and near-infrared regions," Applied Optics, Sep. 1, 1997, pp. 6339-6351, vol. 36, No. 25.

*Primary Examiner*—Mohammad Sikder
(74) *Attorney, Agent, or Firm*—Sughrue Mion, PLLC

(57) ABSTRACT

Antireflection multilayer coatings with only three or four layers are proposed for the production of laser resistant optical components with minimal residual reflection and high transparency for UV light in a wavelength range approx. 150 nm to approx. 250 nm at large angles of incidence in the range of approx. 70° to approx. 80°, particularly in the range between approx. 72° and approx. 76°. For incident p-polarized UV light three-layer systems can be used, in which a layer of low refractive material, in particular magnesium fluoride is arranged between two layers of high refractive material and, in the case of the specified wavelength, of minimally absorbent material, in particular of hafnium oxide or aluminum oxide. For example, this allows a residual reflection of perceptibly less than 1% to be achieved in the case of a wavelength of 248 nm at angles of incidence in the range between approx. 72° and approx. 76°.

18 Claims, 3 Drawing Sheets

Figure 1:
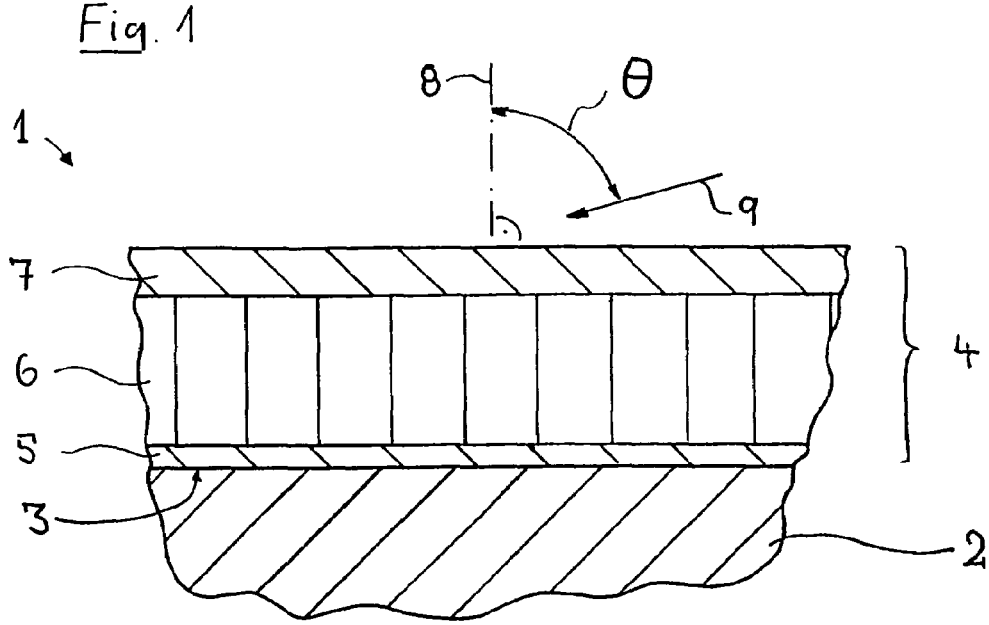

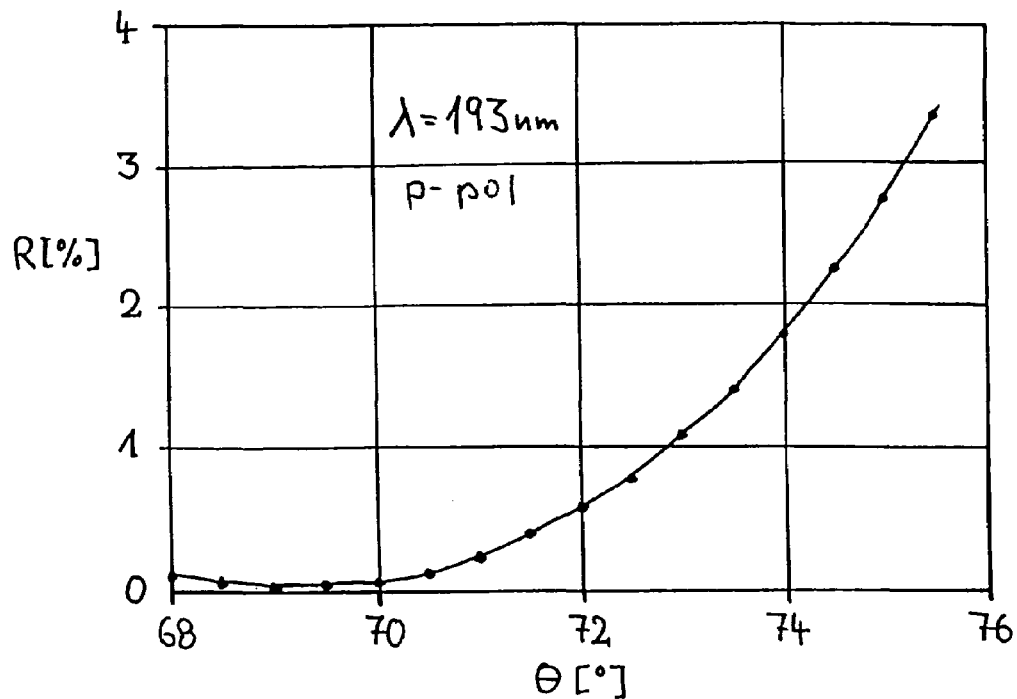
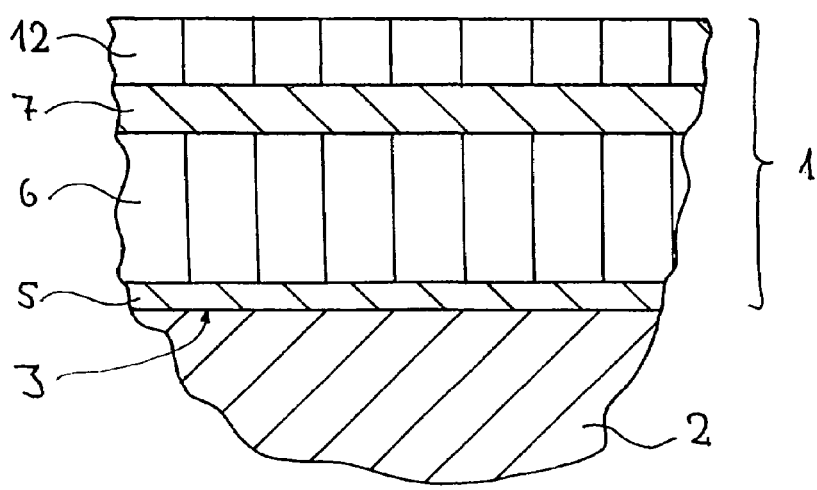

ANTIREFLECTION COATING FOR ULTRAVIOLET LIGHT AT LARGE ANGLES OF INCIDENCE

This is a divisional of application Ser. No. 10/012,351 filed Dec. 12, 2001 now U.S. Pat. No. 6,697,194, the entire disclosure of which is incorporated herein by reference. Priority is claimed from German Patent Application No. 100 64 143.1, filed on Dec. 15, 2000, which is also incorporated into this application by reference.

BACKGROUND OF THE INVENTION

1. Field of the Invention

The invention relates generally to an optical component with a low reflectance for ultraviolet light in a wavelength range between approx. 150 nm and approx. 250 nm at large angles of incidence, in particular between approx. 70° and approx. 80°.

2. Description of the Related Art

In many areas the need is increasing for powerful optical components with a low reflectance and high transparency or transmission for ultraviolet light in a wavelength range between approx. 150 nm and approx. 250 nm. Light from this wavelength range is used for example in microlithographic exposure systems for the production of highly integrated semiconductor components with the aid of wafer steppers or wafer scanners. In the process via an illumination system a light source illuminates a mask (reticle), the image of which is reproduced with the aid of a projection system onto a photoresist coated semiconductor wafer. As it is a known fact that the miniaturization achievable with this process increases the shorter the wavelength $\lambda$ of the light used, in the most modem devices wavelengths from the deep ultraviolet range (Deep Ultraviolet, DUV) are used. Light sources for this are KrF excimer lasers with a working wavelength of $\lambda=248$ nm and ArF excimer lasers with a working wavelength of approx. $\lambda=193$ nm. These lasers generate linear polarized light, which, in the case of a diagonal incidence on a surface of an optical component, occurs either as s-polarized or p-polarized light, according to the individual surface orientation.

As is known the surfaces of transparent optical components are coated with so-called antireflection layers or antireflection layers (AR layers) to increase their transparency for light. Usually, in the process, multilayer systems consisting of several stacked layers of dielectric materials with various refractive indexes are used, in which layers of a high refractive material and layers of a relatively low refractive material are usually stacked alternately on top of each other.

Whereas for an effective reduction of reflection in the case of a vertical incidence of light a few layers can suffice if suitable layer materials are selected, experience shows that the number of layers required increases the bigger the angle of incidence $\Theta$, i.e. the angle between the direction of the incidence of light and the surface normal. This effect is shown for example in EP 0 855 604, in which the antireflection layers for UV light in the wavelength range between 150 nm and 250 nm at large angles of incidence between 70° and 80° are revealed. The multilayer systems proposed there are characterized in that the optical thickness of the layers of high refractive material is always the same and the optical thickness of the intermediate layers of low refractive materials is always the same, so that a periodic layer sequence results. Examples are shown for p-polarized light with a wavelength of $\lambda=193$ nm, according to which in order to minimize the residual reflection to values of below approx. 0.5% at an angle of incidence of $\Theta=72°$ seven layers are required, at an angle of incidence of $\Theta=74°$ nine layers are required and at an angle of incidence of 76° even eleven layers are required. In the case of p-polarized light with a wavelength of $\lambda=248$ nm two additional layers each are required for the corresponding angles of incidence.

The practical use of optical components with antireflection multilayers is frequently influenced by the fact that these types of multilayer systems only show limited resistance when subjected to intensive high-energy UV radiation. As a result, the problem of the lacking laser resistance is pushed all the more to the fore the greater the energy density of the incident light. High energy densities of laser light occur for example in the field of devices for narrowing the bandwidth of excimer lasers. In U.S. Pat. No. 5,978,409 such a device is exemplarily shown, in which an arrangement of three or four prisms is provided to widen a laser beam before incidence on an echelle grate, on the hypotenuse surfaces of which the laser light always is incident with a large angle of incidence. In the case of an optimal configuration with regard to the achievable beam widening three prisms are provided, on the hypotenuse surfaces of which the UV light always impacts with angles of incidence of approx. $\Theta=74°$. As for this configuration in the case of a wavelength of 193 nm, no sufficient laser resistant antireflection layer is available, uncoated prisms would have to be used, which would however lead to overall losses of more than 40% due to reflection in the case of the available substrate materials ($CaF_2$ or synthetic quartz) and a double passage through the prisms. Therefore, as an alternative, an embodiment with four prisms is proposed, on the hypotenuse surfaces of which the laser light is incident with smaller angles of incidence between approx. 67° and approx. 71°. To reduce the reflection a single layer of $Al_2O_3$ is always applied to the surfaces, which has sufficient laser resistance and is also intended to lead to a sufficient reduction in reflection. However, the residual reflection can not be reduced below approx. 3% via such a single layer for angles of incidence of approx. 74°.

It is an object of the invention to provide an antireflection coating for optical components, which allows an effective antireflection coating for ultraviolet light in a wavelength range between approx. 150 nm and approx. 250 nm at large angles of incidence in the range of approx. 70° to approx. 80° and is characterized by high laser resistance.

SUMMARY OF THE INVENTION

As a solution to this object the invention proposes an optical component having low reflectance for ultraviolet light of a wavelength in a range between approx. 150 nm and approx. 250 nm at large angles of incidence, the optical component comprising: a substrate comprising at least one surface; a multilayer system consisting of several stacked layers and applied to the at least one surface of the substrate; a layer of the multilayer system consisting of one of a high refractive dielectric material and a low refractive dielectric material; the multilayer system comprising less than five layers.

Embodiments are specified in the dependent claims. The verbatim of all claims is incorporated by reference into the subject matter of the description.

In accordance with one aspect of the invention an optical component with a low reflectance for UV light is created from the specified wavelength range at large angles of incidence by applying a multilayer system, i.e. a multilayer coating with several stacked layers, which always consists of dielectric material transparent for the UV light, to at least one surface of an optical substrate for the reduction of reflection. The layer materials are high refractive or low refractive, wherein a high refractive material has a higher refractive index in comparison with the refractive index of the other layer material and a low refractive material has a lower refractive index in comparison with the other layer material. Frequently, the refractive index of the substrate material lies between those of the layer materials. The multilayer system has less than five layers. Preferably only three or four layers are provided.

Due to the low number of layers in comparison with known multilayer systems the laser resistance of the coating can be improved only by the fact that the probability of errors leading to layer degradation in the multilayer system is usually lower, the lower the number of layers applied. The type of errors, which decrease the laser resistance, can in particular be impurities, defects or inclusions, which increase the local absorption and can thus lead to an uneven radiation load on the layer. A reduction in the number of layers leads to a process simplification, which can reduce the costs for the provision of the coated optical components according to invention.

The layer adjacent to the substrate, which is also described in the following as the first layer, preferably consists of a high refractive material so that in the case of three-layer systems with alternating high refractive and low refractive layers, the outer, third layer also consists of high refractive material, whereas in the case of four-layer systems with alternating high and low refractive material an outer layer of low refractive material is adjacent to the medium surrounding the optical component.

It is a known fact that there are only a few materials which have a sufficiently high refractive index in the considered wavelength range between approx. 150 nm and 250 nm, to allow a sufficiently large refraction coefficient ratio for an effective multilayer coating in comparison with the available low refractive layer materials. The refractive index or the refraction coefficient n of the high refractive materials for the provided wavelength is preferably at values of $n \geq 1.7$, in particular at values of $n \geq 2.0$. As a preference metal oxides are used as high refractive materials, which due to strong compounds have a relatively high specific laser resistance.

A particular aspect of the invention is that in the case of preferred embodiments of the antireflection coatings that serve to increase transmission, one or more layers, in particular the high refraction layers can consist of materials, which absorb the incident light to a small extent. Such materials are expediently described with a complex refractive index $n=n-ik$, wherein n is the real refractive index and k is the absorption index or the extinction coefficient at considered working wavelength. This is usually below $10^{-6}$ in the case of the so-called non-absorbent materials. It has been shown that in order to avoid negative effects of absorption it usually suffices to select those materials in which the absorption coefficient k is greater than $10^{-6}$ or $10^{-5}$, but less than 0.01, in particular less than 0.005, wherein those materials are preferred, in which k is not significantly greater than 0.001.

The knowledge that slightly absorbent materials can also be used to advantage in the case of transmission increasing antireflection coatings has opened new dimensions in layer design, as the range of available materials, in particular those with a high refractive index is expanding. These advantages can also be used in multilayer systems with more than three or four layers and/or at other angles of incidence than those cited. With regard to the aspired increase in the laser destruction threshold, it should also be taken into consideration that this is indeed influenced by the absorption coefficients of the materials, but that the coating structure influencing the interference effects and the production process also influence the absorption coefficient of the coating.

In preferred embodiments of the coatings for a wavelength of 248 nm according to the invention, hafnium oxide ($HfO_2$) is used as high refractive material. Hafnium oxide has a real refractive index n of approx. 2.1 in this wavelength range, however it also has absorption in this wavelength range and, for this reason among others, was previously not used for antireflection coatings. The absorption coefficient k is approx. 0.001. In the embodiments it is shown that when using hafnium oxide as a high refractive layer material for diagonal incident UV light with a wavelength of 248 nm a reduction of reflection of far below 0.5% residual reflection is possible, wherein the residual reflection practically disappears at an angle of incidence of $\Theta=74°$. The absorption can be in the order of magnitude of approx. 0.2%, so that such coated transparent components can have a transmission coefficient greater than 99% or greater than 99.5%.

For example, zirconium oxide ($ZrO_2$), which has an absorption coefficient in the order of magnitude of $k=0.01$ in the case of a real refraction coefficient n of approx. 2.2, can be used as an alternative.

In the case of multilayer systems for a wavelength of 193 nm aluminum oxide ($Al_2O_3$) is used preferably as high refractive layer material, which at this wavelength has a real refractive index in the order of magnitude of approx. $n=1.7$ and an absorption coefficient of approx. $k=0.001$. Other materials with similar optical properties can also be suitable.

The influence of absorption, in particular on the transmission and the layer heating can be kept to a minimum by keeping the overall thickness of the layers of high refractive and, if necessary, absorbent material to a minimum, for example, with overall layer thicknesses of the high refractive layers of less than 100 nm. The overall thickness can, for example, be less than 50 nm when using hafnium oxide or less than 70 nm when using aluminum oxide.

It is possible to use layer thicknesses, the optical thickness of which deviates from a quarter wavelength layer thickness ("quarterwave" layer thickness). If necessary, all layers of the multilayer system can have different physical thicknesses. However, multilayer systems are also possible in which the layers of the same material also have the same optical thickness.

Fluorides are used preferably as low refractive materials, in particular magnesium fluoride ($MgF_2$). Possible alternatives such as calcium fluoride, sodium fluoride, lithium fluoride or aluminum fluoride are conceivable, insofar as the refractive index of the appropriate material is lower than that of the high refractive material and, if necessary, of the substrate material. Suitable substrate materials for transparent optical components are above all silicon oxide as glass (synthetic quartz) or single crystalline materials such as calcium fluoride or magnesium fluoride and also, if necessary, barium fluoride.

These and other features result from the description and the drawings as well as from the claims, wherein each of the individual features can always be realized individually or together in the form of sub-combinations in an embodiment of the invention and in other fields and can represent advantageous, as well as protectable embodiments.

Figure 2:
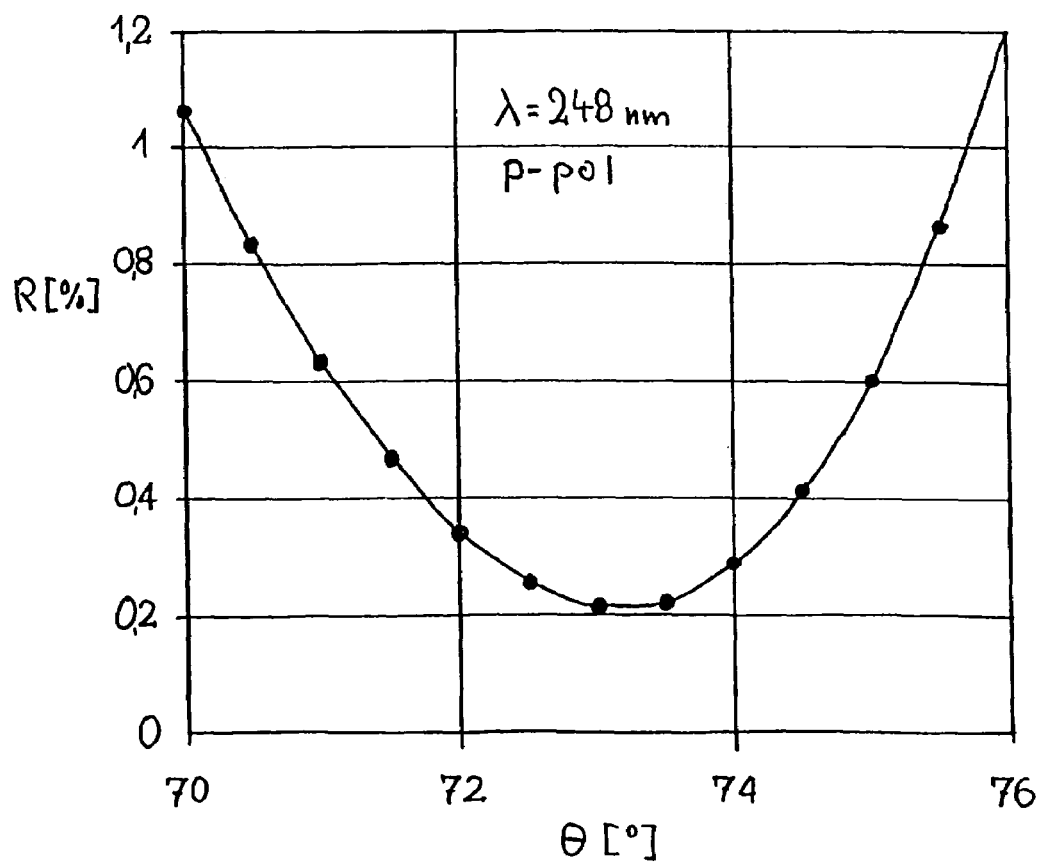
Figure 5:
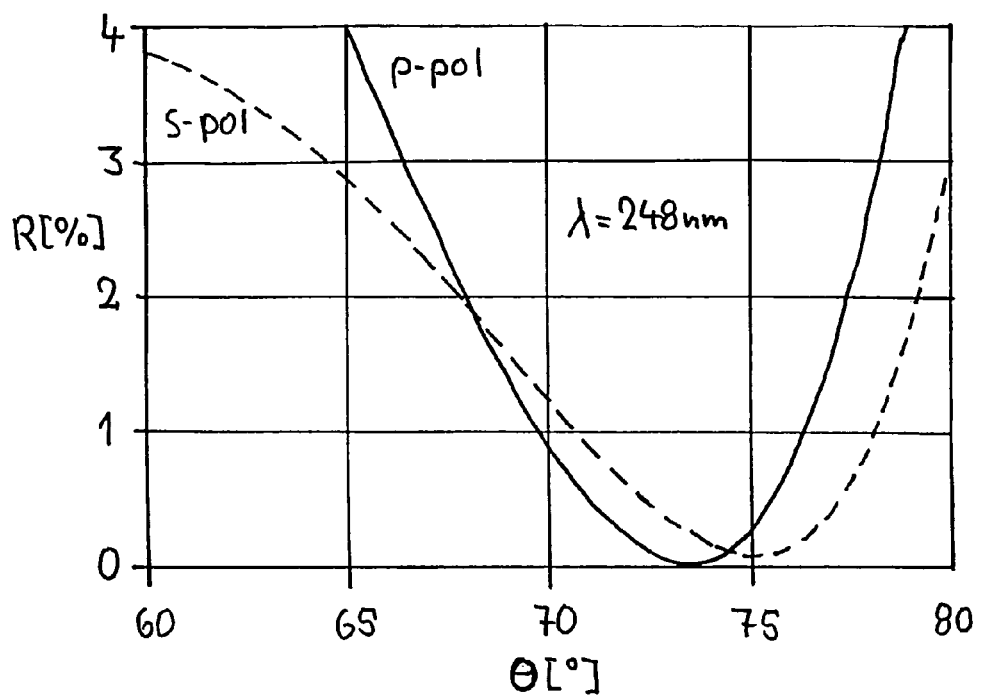
Figure 6:
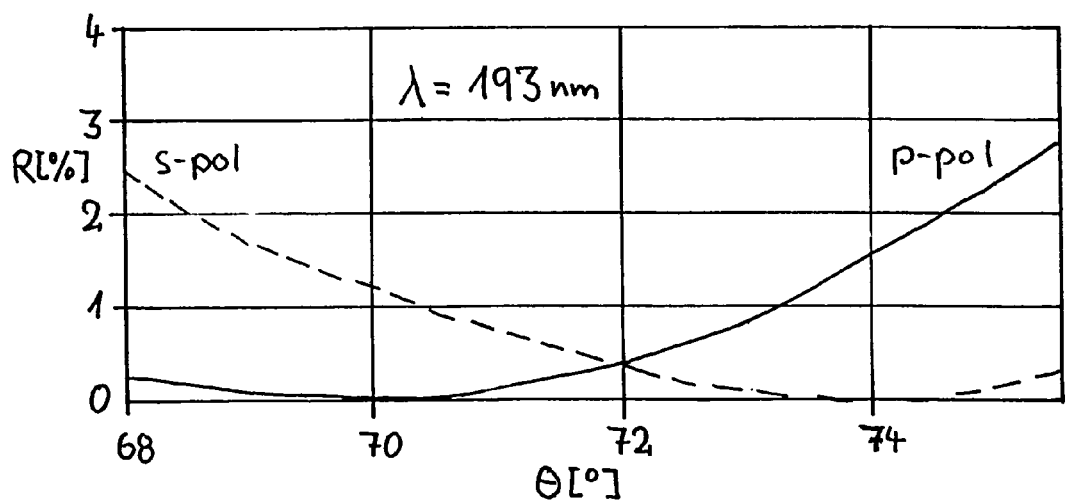

Embodiments of the invention are portrayed in the drawings and are described in more detail in the following. Shown are:

FIG. 1 a schematic section through a antireflection layer with three layers applied to a transparent substrate for the reduction of reflection a wavelength of 248 nm and large angles of incidence in the range of approx. 74°, FIG. 2 a diagram, which shows measured values for the reflectance of the layer portrayed in FIG. 1 as a function of the angle of incidence $\Theta$, FIG. 3 a diagram, which shows the measured values for the reflectance as a function of the angle of incidence $\Theta$ for a wavelength of $\lambda=193$ nm for a three-layer system with aluminum oxide as high refractive material, FIG. 4 a schematic section through a antireflection layer with four layers on a transparent substrate, FIG. 5 a diagram, which shows a comparison of calculated values for the reflectance of multiple layers as a function of the angle of incidence at $\lambda=248$ nm, wherein a triple layer is used for p-polarized light and a quadruple layer is used for s-polarized light; and FIG. 6 a diagram which shows a comparison of calculated values for the reflectance of multiple layers as a function of the angle of incidence at $\lambda=193$ nm, wherein a triple layer is used for p-polarized light and a quadruple layer is used for s-polarized light.

FIG. 1 contains a schematic section through the surface area of an optical component 1, which has a substrate 2 made of a material transparent for ultraviolet light with a wavelength of 248 nm. On the shown flat surface 3 of the substrate, which can for example be the hypotenuse surface of a prism, a multilayer antireflection coating 4 with three stacked layers 5, 6, 7 is applied.

The substrate consists of a single crystalline calcium fluoride ($CaF_2$) with a refractive index of $n=1.47$, i.e. a refractive index similar to that of alternatively usable materials such as e.g. synthetic quartz glass ($SiO_2$) with $n=1.5$. The first layer 5 applied directly to the surface 3 of the substrate consists essentially of hafnium oxide ($HfO_2$) which has a relatively high refractive index of $n=2.1$ at a wavelength of $\lambda=248$ nm. The high refractive layer 5 adjacent to the substrate is with a physical layer thickness of approx. 10 nm very thin in comparison with the "quarterwave layer thicknesses" usually used for antireflection coatings and is only approx. ⅓ of this "quarterwave layer thickness". The second layer 6 above consists essentially of magnesium fluoride ($MgF_2$) which, in comparison with substrate 2, has a low refractive index of approx. $n=1.41$. The layer thickness of layer 6 consisting of low refractive material is at 94.4 nm almost ten times that of the thin first layer 5, wherein this layer thickness is equivalent to more than double the corresponding "quarterwave layer thickness" (43.7 nm $MgF_2$). The outer third layer 7, which is usually adjacent to air, another gaseous medium or vacuum, with a refractive index of approx. $n=1$ again consists of hafnium oxide, but in comparison with layer 5 adjacent to the substrate, has approx. the triple layer thickness (28.8 nm), which is equivalent to the "quarterwave layer thickness" for hafnium oxide at 248 nm.

The layers of the examples shown and all those following are applied to the substrate 2 via the usual method of physical vapor deposition (PVD) in vacuum. To apply the coating any other suitable technique can also be used.

The three-layer system exemplarily shown here is characterized in comparison with conventional known systems for antireflection coating purposes among other things in that with hafnium oxide a coating material is used, which, in the provided wavelength range ($\lambda=248$ nm), shows a minimal but measurable absorption. Whereas in the case of conventional non-absorbent materials the absorption coefficient $k$ has typical values of below $10^{-6}$, the absorption coefficient of hafnium oxide is approx. $k=10^{-3}$ at $\lambda=248$ nm. It has been shown that this disadvantage has practically no effect whatsoever and is perceptibly outweighed by the advantage of the high refractive index of the material. In addition, the overall absorption can be kept to a minimum if the overall thickness of the layers consisting of absorbent material is kept to a minimum. In the example this overall layer thickness of layers 5 and 7 is less than 40 nm, which means that typical disadvantages expected for absorbent materials such as intensified heating of the layers and the associated layer degradation practically do not occur. Endurance tests to achieve laser resistance in which layers with similar layer structure are subjected to laser pulses with energy densities of approx. 30 mJ/cm$^2$, show no layer degradation, tears, or other degradations, even after several billion pulses, which verifies the laser resistance of these layers.

Significant optical properties of the three-layer antireflection coating shown are explained with the aid of the measuring diagram in FIG. 2. There the reflectance R is shown (as a percentage) of the layer system shown in FIG. 1 dependent on the angle of incidence $\Theta$, in which p-polarized UV light is incident with a wavelength of $\lambda=248$ nm. In accordance with the convention the angle of incidence $\Theta$ describes the angle between the surface normal 8 and the direction of incidence 9, both designate the plane of incidence, in which the vector of the electrical field of the incident UV light oscillates. It can be discerned that the reflectance of the surface coated with the three-layer antireflection coating 4 in the angle of incidence range between approx. 70.5° and approx. 75.5° is below 1% and in the range between approx. 72° and approx. 74.5° is perceptibly below 0.5%. In the angle range between approx. 72.5° and approx. 74° an almost complete antireflection coating is achieved, in which the residual reflection is below approx. 0.3%. The influence of the absorption is very low at approx. 0.2%, so that in the angle range between approx. 72.5° and 74° transmission coefficients of 99.5% or better can be achieved.

The layer design exemplarily explained with the aid of FIG. 1 is relatively tolerant as regards small variations of the layer thicknesses such as can those which can occur due to process fluctuations during the coating. Thus, for example, thickness changes of approx. ±5% only insignificantly alter the reflectance by approx. 0.3%. Essentially, identical layer thicknesses of the high refractive material are also possible. A triple layer with 21.5 nm $HfO_2$ as first layer, 99.7 nm $MgF_2$ as second layer and 21.5 nm $HfO_2$ as third layer has similar optical properties. As an alternative to hafnium oxide other dielectric substances or material combinations with similar optical properties can be used, for example zirconium oxide. If necessary, instead of the magnesium fluoride layer, a layer of another low refractive material in comparison with the substrate can be used. Advantageous is the alternating sequence of high refractive and low refractive material, wherein the layer adjacent to the substrate should have a higher refractive index than the substrate material.

At a wavelength of 193 nm the absorption of hafnium oxide or similar materials is such as high that these materials cannot be used or can only be used in exceptional cases for antireflection coatings. At these wavelengths another three-layer system (not illustrated) has proved itself, in which aluminum oxide was used as a high refractive substance.

This layer system also consists only of three layers, wherein a high refractive aluminum oxide layer is directly adjacent to the $CaF_2$ substrate and a thicker layer of magnesium oxide is arranged between this and the outer aluminum oxide layer. In the case of an embodiment the optical properties of which are explained with the aid of the measuring diagram of FIG. 3, a layer of magnesium fluoride with a thickness of 45 nm is arranged between two layers of aluminum oxide of the same thickness with layer thicknesses of 31.5 nm each. It can be discerned from FIG. 3 that in the case of this layer system and incident p-polarized light with a wavelength of $\lambda=193$ nm the minimum residual reflection is at an angle of incidence of approx. 69° to 70°, at which the residual reflection is less than 0.1%. Also, in the case of deviations of ±2° from this optimal angle of incidence residual reflections of less than 0.5% are still achieved, wherein for example the residual reflection is still less than 1% at an angle of incidence of $\Theta=72°$.

It can be discerned that in the case of the triple layer systems according to the invention the minimum residual reflection moves itself to smaller angles of incidence the shorter the wavelength of the incident light. However, even at a wavelength of 193 nm and angles of incidence of 74° a substantial antireflection coating can still be achieved in comparison with an uncoated substrate, as in the case of the triple layer coating shown in FIG. 3 the residual reflection is approx. 1.8%, whereas in the case of an uncoated $CaF_2$ substrate it is approx. R=8%.

With the aid of FIG. 4 to 6 it is now exemplarily explained that on the basis of the exemplarily explained triple layers effective antireflection coatings for the specified wavelength and angle of incident ranges can also be generated for s-polarized light by the application of a single additional layer of low refractive material. Moreover, FIG. 4 shows a schematic section through the surface area of an optical component 10, which essentially differs from the optical component 1 in FIG. 1 in that an antireflection coating 11 with four stacked layers 5, 6, 7, 12 is applied to surface 3 of the substrate 2. The three layers 5, 6, 7 adjacent to the substrate are identical to the layers 5, 6, 7 from FIG. 1 with regard to the layer material and only differ from them due to minimal differences in thickness. The layer thickness of the hafnium oxide layer 5 adjacent to the substrate is approx. 14 nm, that of the magnesium fluoride layer 6 above approx. 109 nm and that of the hafnium oxide layer 7 above approx. 30 nm. On top of this a magnesium fluoride layer 12 of approx. 53 nm layer thickness is applied as an outer layer.

The optical properties of the four-layer antireflection coating 11 are explained with the aid of FIG. 5, which shows the reflectance R as a function of the angle of incidence $\Theta$ for incident UV light with a wavelength of 248 nm. The continuous line of the curve in FIG. 2 shows appropriately calculated values for the reflectance of the triple layer in FIG. 1 for p-polarized light, whereas the broken line in FIG. 4 shows appropriate values of the quadruple layer shown in FIG. 4 for s-polarized light. It can be discerned that the quadruple coating 11 reduces the residual reflection to values of below 1% for angles of incidence between approx. 71° and approx. 78°, wherein the residual reflection in the range between approx. 73.5° and approx. 76° is below 0.3% and has a minimum of 0.1% at approx. 75°.

FIG. 6 shows an appropriate diagram for UV light with $\lambda=193$ nm, wherein the continuous line corresponds to the measuring curve from FIG. 3 and also represents a triple layer, in which a layer of magnesium fluoride with a thickness of approx. 45 nm is always arranged between a layer adjacent to the substrate and an outer layer of aluminum oxide of 31.5 nm each. On this layer system an additional layer of magnesium fluoride with a layer thickness of approx. 45 nm is applied to improve the reflectance reduction in the case of s-polarized light. This periodic layer structure, in which the layer thicknesses of the high refractive minimally absorbent material (aluminum oxide) and the low refractive material (magnesium oxide) are the same, reduces the residual reflection to values of below 1% in the case of s-polarized light in the angle range between approx. 71° and approx. 75°, wherein between approx. 72° and approx. 76° the residual reflection is less than 0.5% and essentially disappears at approx. 74°.

Reflex reducing multilayer coatings with only three or four layers are proposed for the production of laser resistant optical components with minimal residual reflection for UV light in a wavelength range approx. 150 nm to approx. 250 nm at large angles of incidence in the range of approx. 70° to approx. 80°, particularly from the range between approx. 72° and 76°. For incident p-polarized UV light three-layer systems can be used to advantage, in which a layer of low refractive material, in particular magnesium fluoride, is arranged between two layers of high refractive material, in particular of hafnium oxide or aluminum oxide. An optimization of the reflectance reduction for s-polarized light can be achieved via the application of an additional layer of low refractive material.

A particular aspect of the invention is based upon the knowledge that in the case of multilayer antireflection coatings not only so-called non-absorbent materials (with typical absorption coefficients k of below $10^{-6}$) can be used, but also those materials which show a low absorption, as long as the absorption coefficient k does not significantly exceed values of 0.01, in particular 0.001. In particular, materials such as hafnium oxide or, if necessary, zirconium oxide can be used for wavelengths of approx. $\lambda=248$ nm, wherein it is expedient to only aspire to minimal overall layer thicknesses of perceptibly less than 100 nm, in order to avoid negative effects of absorption. These conditions could be adhered to, particularly in the case of multilayer systems with only few, for example three of four, layers in any case.

Tests have shown that an antireflection multilayer coating with an outer situated layer of aluminum oxide is also advantageous with regard to the avoidance or reduction of contamination effects. It is a known fact that under the influence of short wave ultraviolet radiation on conventional coating materials such as magnesium fluoride a surface deposit forms after a certain period of time, which reduces the life of the optical elements used and can lead to an increased amount of diffused light. For example, a deposit formation of ammonium salts and other impurities is known from U.S. Pat. No. 5,685,895. In radiation tests in which antireflection multilayer coatings with an outer aluminum oxide layer were compared with appropriate multilayer coatings and an outer layer of another material it emerged that an outer deposit protection layer of aluminum oxide led to a perceptibly measurable delay in contamination. This enabled the proof to be furnished that a top layer of aluminum oxide ($Al_2O_3$) can significantly reduce the rate of salification on optical surfaces under UV radiation. Thus, the invention also encompasses a process to protect coated optical components against the formation of deposit, which is characterized in that an outer layer of aluminum oxide is applied to a multilayer coating. In addition, the use of aluminum oxide as an outer protective layer against the formation of deposits on mulitlayer coatings is proposed. This surprising and advantageous effect against the formation of deposits is independent of the number of layers of the optical multilayer system and can in particular also be used to advantage in antireflection multilayer systems with five or more layers.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. An optical component having low reflectance for ultraviolet light of a wavelength in a range between approx. 150 nm and approx. 250 nm at large angles of incidence, the optical component comprising:
    a substrate comprising at least one surface;
    a multilayer system comprising several stacked layers and applied to the at least one surface of the substrate;
    a layer of the multilayer system consisting of at least one of a high refractive dielectric material and a low refractive dielectric material;
    the multilayer system consisting of less than five layers.

2. The optical component according to claim 1, wherein the multilayer system consists of three or four layers.

3. The optical component according to claim 1, wherein the multilayer system comprises a first layer arranged adjacent to the substrate, wherein the first layer consists of a high refractive material.

4. The optical component according to claim 1, wherein the layers of the multilayer system are alternately consisting of a high refractive material and a low refractive material.

5. The optical component according to claim 1, wherein at a specified working wavelength the high refractive index material has a refractive index equal to or greater than 1.7.

6. The optical component according to claim 5, wherein the refractive index of the high refractive material is greater then 1.9.

7. The optical component according to claim 1, wherein the high refractive material consists essentially of a metal oxide selected from a group consisting of hafnium oxide, zirconium oxide and aluminum oxide.

8. The optical component according to claim 1, wherein at least one of the materials constituting at least one layer is slightly absorbent at the working wavelength of ultraviolet light.

9. The optical component according to claim 8, wherein an absorption coefficient k of the slightly absorbent material is greater than or equal to approx. $10^{-6}$ and less than approximately 0.01.

10. The optical component according to claim 8, wherein an overall thickness of the layers made of slightly absorbent material is less than approximately 100 nm.

11. The optical component according to claim 1, wherein the low refractive material consists essentially of at least one of fluoride and magnesium fluoride.

12. The optical component according to claim 1, wherein the substrate is made of a material selected from the group consisting of glass-like silicon dioxide and fluoride crystal.

13. The optical component according to claim 1, having a residual reflection of less than 1% for ultraviolet light with a wavelength of approximately 248 nm for angles of incidence in a range of 74±2°.

14. The optical component according to claim 1, having a residual reflection of less than 2% for ultraviolet light with a wavelength of 193 nm for angles of incidence between approx. 70° and approx. 75°.

15. The optical component according to claim 1, wherein an absorption coefficient caused by the multilayer system is less than approximately 1%.

16. The optical component according to claim 1, wherein the multilayer system comprises a layer of aluminum oxide ($Al_2O_3$) as the outer layer furthest apart from the substrate.

17. An optical component having low reflectance for ultraviolet light of a wavelength in a in a range between approx. 150 nm and approx. 250 nm at large angles of incidence, the optical component comprising:
    a substrate comprising at least one surface;
    a multilayer system comprising several stacked layers and applied to the at least one surface of the substrate;
    a layer of the multilayer system consisting of one of a high refractive dielectric material and a low refractive dielectric material;
    the multilayer system comprising a layer of aluminum oxide ($Al_2O_3$) as the outer layer furthest apart from the substrate.

18. An optical component, comprising:
    a substrate comprising at least one surface;
    a multilayer system comprising several stacked layers and applied to the at least one surface of the substrate;
    a layer of the multilayer system consisting of one of a high refractive dielectric material and a low refractive dielectric material;
    the multilayer system comprising a layer of aluminum oxide ($Al_2O_3$), as the outer layer furthest apart from the substrate, protecting against an adverse influence on the optical component of ultraviolet light of a wavelength in a in a range between approx. 150 nm and approx. 250 nm.

* * * * *

UNITED STATES PATENT AND TRADEMARK OFFICE
CERTIFICATE OF CORRECTION

PATENT NO. : 6,967,771 B2
DATED : November 22, 2005
INVENTOR(S) : Ralf Kuschnereit, Hans-Jochen Paul and Jeffrey Erxmeyer It is certified that error appears in the above-identified patent and that said Letters Patent is hereby corrected as shown below:

Title page,
Item [75], Inventors, insert -- Dr. Jeffrey Erxmeyer, Oberkochen, (DE) --.

Signed and Sealed this

Twenty-fourth Day of January, 2006

JON W. DUDAS
*Director of the United States Patent and Trademark Office*